United States Patent
Chin et al.

(10) Patent No.: US 7,961,679 B2
(45) Date of Patent: Jun. 14, 2011

(54) METHODS AND SYSTEMS FOR BROADCASTING QOS INFORMATION TO ASSIST ADMISSION CONTROL IN WIRELESS COMMUNICATION SYSTEMS

(75) Inventors: Tom Chin, San Diego, CA (US); Guangming Carl Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 12/251,303

(22) Filed: Oct. 14, 2008

(65) Prior Publication Data

US 2010/0091651 A1    Apr. 15, 2010

(51) Int. Cl.
*H04W 4/00* (2009.01)
(52) U.S. Cl. ...................................................... 370/329
(58) Field of Classification Search .................. 370/329, 370/335, 352, 338, 328; 455/450, 552.1, 455/513, 63.1
See application file for complete search history.

(56) References Cited

U.S. PATENT DOCUMENTS

| | | | |
|---|---|---|---|
| 6,385,451 B1 * | 5/2002 | Kalliokulju et al. | 455/437 |
| 6,990,324 B2 * | 1/2006 | Laroia et al. | 455/226.1 |
| 7,400,901 B2 | 7/2008 | Kostic et al. | |
| 7,554,962 B2 | 6/2009 | Takeuchi | |

FOREIGN PATENT DOCUMENTS

| | | |
|---|---|---|
| EP | 1133208 A2 | 9/2001 |
| EP | 1156623 | 11/2001 |
| WO | WO2004028175 | 4/2004 |

OTHER PUBLICATIONS

International Search Report—PCT/US2009/060161, International Search Authority≧European Patent Office—Dec. 23, 2009.

* cited by examiner

*Primary Examiner* — Ricky Ngo
*Assistant Examiner* — Chandrahas Patel
(74) *Attorney, Agent, or Firm* — Milan I. Patel (57) ABSTRACT

A base station may broadcast quality of service (QoS) and loading information to mobile stations. When a mobile station determines that there is demand for a new traffic connection, the mobile station may select a base station from which to request the desired traffic connection based on the QoS information and the loading information received from one or more base stations.

20 Claims, 9 Drawing Sheets

METHODS AND SYSTEMS FOR BROADCASTING QOS INFORMATION TO ASSIST ADMISSION CONTROL IN WIRELESS COMMUNICATION SYSTEMS

TECHNICAL FIELD

The present disclosure relates generally to communication systems. More specifically, the present disclosure relates to broadcasting quality of service (QoS) information to assist admission control in wireless communication systems.

BACKGROUND

Wireless communication systems have become an important means by which many people worldwide have come to communicate. A wireless communication system may provide communication for a number of mobile stations, each of which may be serviced by a base station. As used herein, the term "mobile station" refers to an electronic device that may be used for voice and/or data communication over a wireless communication system. Examples of mobile stations include cellular phones, personal digital assistants (PDAs), handheld devices, wireless modems, laptop computers, personal computers, etc. A mobile station may alternatively be referred to as an access terminal, a mobile terminal, a subscriber station, a remote station, a user terminal, a terminal, a subscriber unit, a mobile device, a wireless device, user equipment, or some other similar terminology. The term "base station" refers to a wireless communication station that is installed at a fixed location and used to communicate with mobile stations. A base station may alternatively be referred to as an access point, a Node B, an evolved Node B, or some other similar terminology.

A mobile station may communicate with one or more base stations via transmissions on the uplink and the downlink. The uplink (or reverse link) refers to the communication link from the mobile station to the base station, and the downlink (or forward link) refers to the communication link from the base station to the mobile station.

The resources of a wireless communication system (e.g., bandwidth and transmit power) may be shared among multiple mobile stations. A variety of multiple access techniques are known, including code division multiple access (CDMA), time division multiple access (TDMA), frequency division multiple access (FDMA), orthogonal frequency division multiple access (OFDMA), single-carrier frequency division multiple access (SC-FDMA), and so forth.

Benefits may be realized by improved methods and apparatus related to the operation of wireless communication systems.

SUMMARY

A method for facilitating efficient admission control is disclosed. The method may be implemented by a mobile station. The method may include receiving quality of service (QoS) information and loading information from at least one base station. The method may also include determining that there is demand for a traffic connection. The method may also include selecting a base station from which to request the desired traffic connection based on the QoS information and the loading information.

A method for facilitating efficient admission control is disclosed. The method may be implemented by a base station. The method may include determining quality of service (QoS) information for the base station. The method may also include determining loading information for the base station. The method may also include broadcasting the QoS information and the loading information to mobile stations.

A mobile station configured for facilitating efficient admission control is disclosed. The mobile station may include a processor, memory in electronic communication with the processor, and instructions stored in the memory. The instructions may be executable by the processor to receive quality of service (QoS) information and loading information from at least one base station. The instructions may also be executable to determine that there is demand for a traffic connection. The instructions may also be executable to select a base station from which to request the desired traffic connection based on the QoS information and the loading information.

A base station for facilitating efficient admission control is disclosed. The base station may include a processor, memory in electronic communication with the processor, and instructions stored in the memory. The instructions may be executable by the processor to determine quality of service (QoS) information for the base station. The instructions may also be executable to determine loading information for the base station. The instructions may also be executable to broadcast the QoS information and the loading information to mobile stations.

A mobile station configured for facilitating efficient admission control is disclosed. The mobile station may include means for receiving quality of service (QoS) information and loading information from at least one base station. The mobile station may also include means for determining that there is demand for a traffic connection. The mobile station may further include means for selecting a base station from which to request the desired traffic connection based on the QoS information and the loading information.

A base station for facilitating efficient admission control is disclosed. The base station may include means for determining quality of service (QoS) information for the base station. The base station may also include means for determining loading information for the base station. The mobile station may also include means for broadcasting the QoS information and the loading information to mobile stations.

A computer-program product for facilitating efficient admission control by a mobile station is disclosed. The computer-program product may include a computer-readable medium having instructions thereon. The instructions may include code for receiving quality of service (QoS) information and loading information from at least one base station. The instructions may also include code for determining that there is demand for a traffic connection. The instructions may also include code for selecting a base station from which to request the desired traffic connection based on the QoS information and the loading information.

A computer-program product for facilitating efficient admission control by a base station is disclosed. The computer-program product may include a computer-readable medium having instructions thereon. The instructions may include code for determining quality of service (QoS) information for the base station. The instructions may also include code for determining loading information for the base station. The instructions may also include code for broadcasting the QoS information and the loading information to mobile stations.

In certain embodiments, each of the mobile station and/or base station embodiments presented herein can be configured for operation in a wireless communication system that supports an Institute of Electronic and Electrical Engineers (IEEE) 802.16 standard

DETAILED DESCRIPTION

The methods and apparatus disclosed herein may be implemented in WiMAX systems. The term "WiMAX" refers to a family of standards that is prepared by the Institute of Electronic and Electrical Engineers (IEEE) 802.16 Working Group on Broadband Wireless Access Standards. Thus, the term "WiMAX system" refers to a wireless communication system that is configured in accordance with one or more WiMAX standards.

Quality of service (QoS) is the ability to provide different priority to different data flows, or to guarantee a certain level of performance to a data flow. For example, a required bit rate, delay, jitter, packet dropping probability and/or bit error rate may be guaranteed.

One aspect of QoS is admission control. Admission control is the ability of a system to control admission to new traffic, based on resource availability. Admission control may be performed to ensure that new traffic is admitted only if such admission will not compromise the performance of existing traffic.

In a WiMAX system, a mobile station that wishes to use system resources to transport traffic with a particular QoS first sends a connection request to a base station. The connection request may include information about the characteristics of the traffic and the desired QoS. The base station may then determine whether it has enough resources available to accept the connection, and the base station either accepts or rejects the connection request.

Presently, when a mobile station in a WiMAX system makes a connection request, the mobile station does not have any information about the QoS capabilities or the current loading of the potential base station(s). There may be certain disadvantages with this.

For example, suppose that a mobile station requests a new connection with certain QoS parameters from a base station. Because the mobile station did not know anything about the base station's QoS capabilities when it made the connection request, it is possible that base station does not have sufficient resources to provide the requested QoS parameters, and therefore the base station may reject the connection in the first run. When this occurs, the mobile station may send another connection request to the base station with downgraded QoS parameters. This negotiation process takes additional CPU processing and causes delay.

As another example, suppose that a mobile station is within the coverage area of multiple base stations when the mobile station determines that there is demand for a traffic connection. Because the mobile station does not know anything about the various base stations' QoS capabilities, the mobile station does not know which base station to select. Therefore, the mobile station blindly chooses one base station from which to request admission. However, the selected base station may not meet the QoS requirements of the mobile station, and therefore the new traffic connection may be rejected by the base station.

The present disclosure relates generally to methods for facilitating efficient admission control in a wireless communication system. Instead of having the mobile station blindly request admission, the present disclosure proposes that the base stations broadcast some QoS and loading information to mobile stations. Then, the mobile stations may use the QoS and loading information when making connection requests. For example, if a mobile station is within the coverage area of multiple base stations when it determines that there is demand for a new traffic connection, the mobile station may use the QoS and loading information to choose the most preferred base station. In addition, the mobile station may use the QoS and loading information to choose what QoS parameters should be requested.

Figure 1:
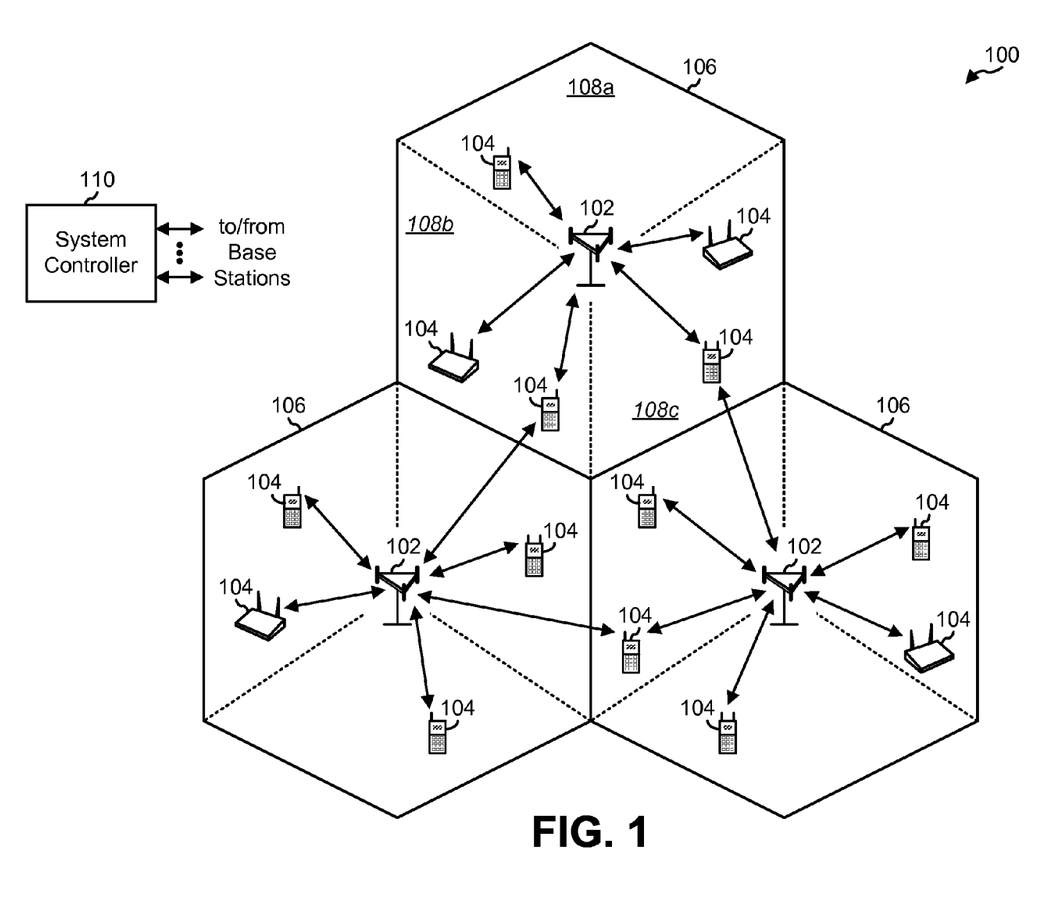
FIG. 1 shows an example of a wireless communication system in which the methods disclosed herein may be utilized.

FIG. 1 shows an example of a wireless communication system 100 in which the methods disclosed herein may be utilized. The wireless communication system 100 includes multiple base stations (BS) 102 and multiple mobile stations (MS) 104. Each base station 102 provides communication coverage for a particular geographic area 106. The term "cell" can refer to a base station 102 and/or its coverage area 106 depending on the context in which the term is used.

To improve system capacity, a base station coverage area 106 may be partitioned into multiple smaller areas, e.g., three smaller areas 108a, 108b, and 108c. Each smaller area 108a, 108b, 108c may be served by a respective base transceiver station (BTS). The term "sector" can refer to a BTS and/or its coverage area 108 depending on the context in which the term is used. For a sectorized cell, the BTSs for all sectors of that cell are typically co-located within the base station 102 for the cell.

Mobile stations 104 are typically dispersed throughout the system 100. A mobile station 104 may communicate with zero, one, or multiple base stations 104 on the downlink and/or uplink at any given moment.

For a centralized architecture, a system controller 110 may couple to the base stations 102 and provide coordination and control for the base stations 102. The system controller 110 may be a single network entity or a collection of network entities. For a distributed architecture, base stations 102 may communicate with one another as needed.

Figure 2:
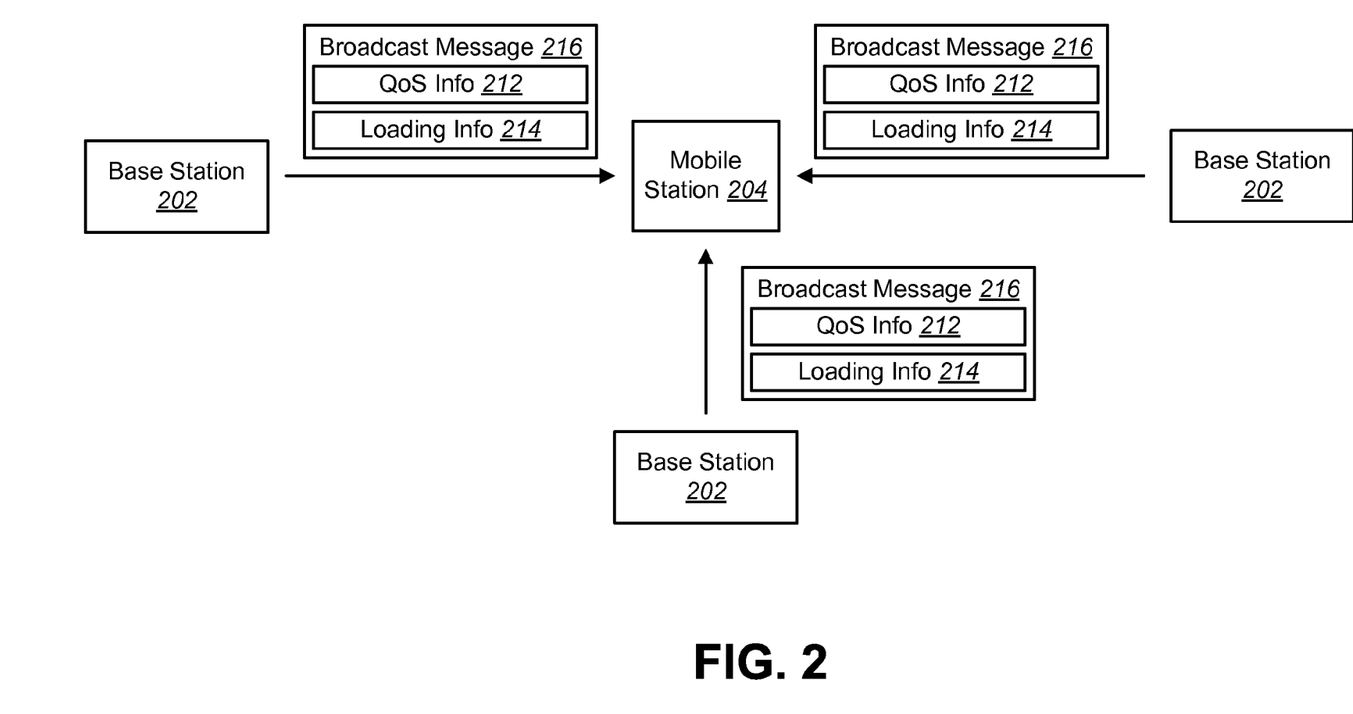
FIG. 2 illustrates a mobile station within the coverage area of multiple base stations within a wireless communication system, the mobile station and the base stations being configured to facilitate efficient admission control in accordance with the present disclosure.

FIG. 2 illustrates a mobile station 204 that may be located within the coverage area 106 of multiple base stations 202 within a wireless communication system. The mobile station 204 may receive QoS information 212 and loading information 214 from each base station 202. Each base station 202 may send its QoS information 212 and loading information 214 in a broadcast message 216 that is sent to multiple mobile stations (not shown). The mobile station 204 may use the QoS information 212 and the loading information 214 when making connection requests, as will be described in greater detail below.

As mentioned, each base station 202 may send its QoS information 212 and loading information 214 in a broadcast message 216. If the wireless communication system is a WiMAX system, then the QoS information 212 and the loading information 214 may be included in new parameters of an existing WiMAX message. In other words, a message that is currently defined in WiMAX standards (e.g., the downlink MAP message, the uplink MAP message, etc.) may be modified to include additional parameters for the QoS information 212 and the loading information 214. Alternatively, the QoS information 212 and the loading information 214 may be included in a new WiMAX message, i.e., a message that is not currently defined in WiMAX standards.

The QoS information 212 and the loading information 214 may be broadcast once every N frames. Alternatively, the QoS information 212 and the loading information 214 may be broadcast every frame.

Figure 3:
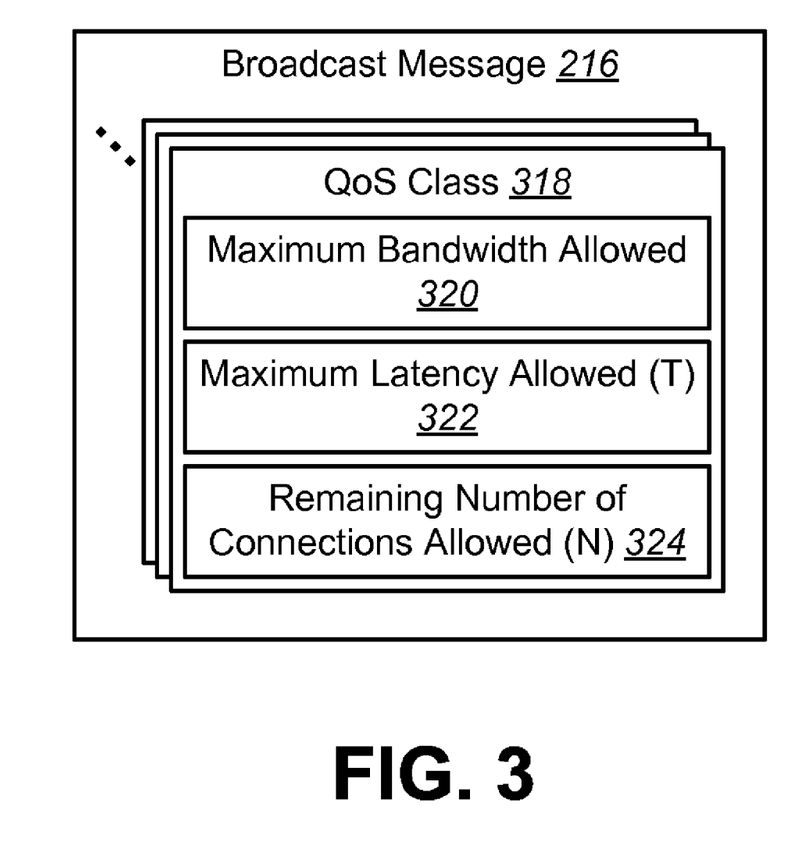
FIG. 3 illustrates a broadcast message that may be sent by a base station in accordance with the present disclosure.

FIG. 3 illustrates the broadcast message 216 in greater detail. The broadcast message 216 may include the following information for each QoS class 318: the maximum bandwidth allowed (B) 320, the maximum latency allowed (T) 322, and the remaining number of connections allowed (N) 324. The maximum bandwidth allowed 320 and the maximum latency allowed 322 are examples of QoS information 212. The remaining number of connections allowed 324 is an example of loading information 214.

In a WiMAX system, the different QoS classes 318 include unsolicited grant services (UGS), real-time variable rate (RT-VR), extended-real-time variable rate (ERT-VR), non-real-time variable rate (NRT-VR) and best effort (BE). UGS is designed to support fixed-size data packets at a constant bit rate. Examples of applications that may use UGS are T1/E1 emulation and voice-over-IP (VoIP) without silence suppression. ERT-VR is designed to support real-time applications, such as VoIP with silence suppression, that have variable data rates but require guaranteed data rate and delay. RT-VR is designed to support real-time service flows, such as MPEG video, that generate variable-size data packets on a periodic basis. NRT-VR is designed to support delay-tolerant data streams, such as FTP, that require variable-size data grants at a minimum guaranteed rate. BE is designed to support data streams, such as Web browsing, that do not require a minimum service-level guarantee.

Figure 4:
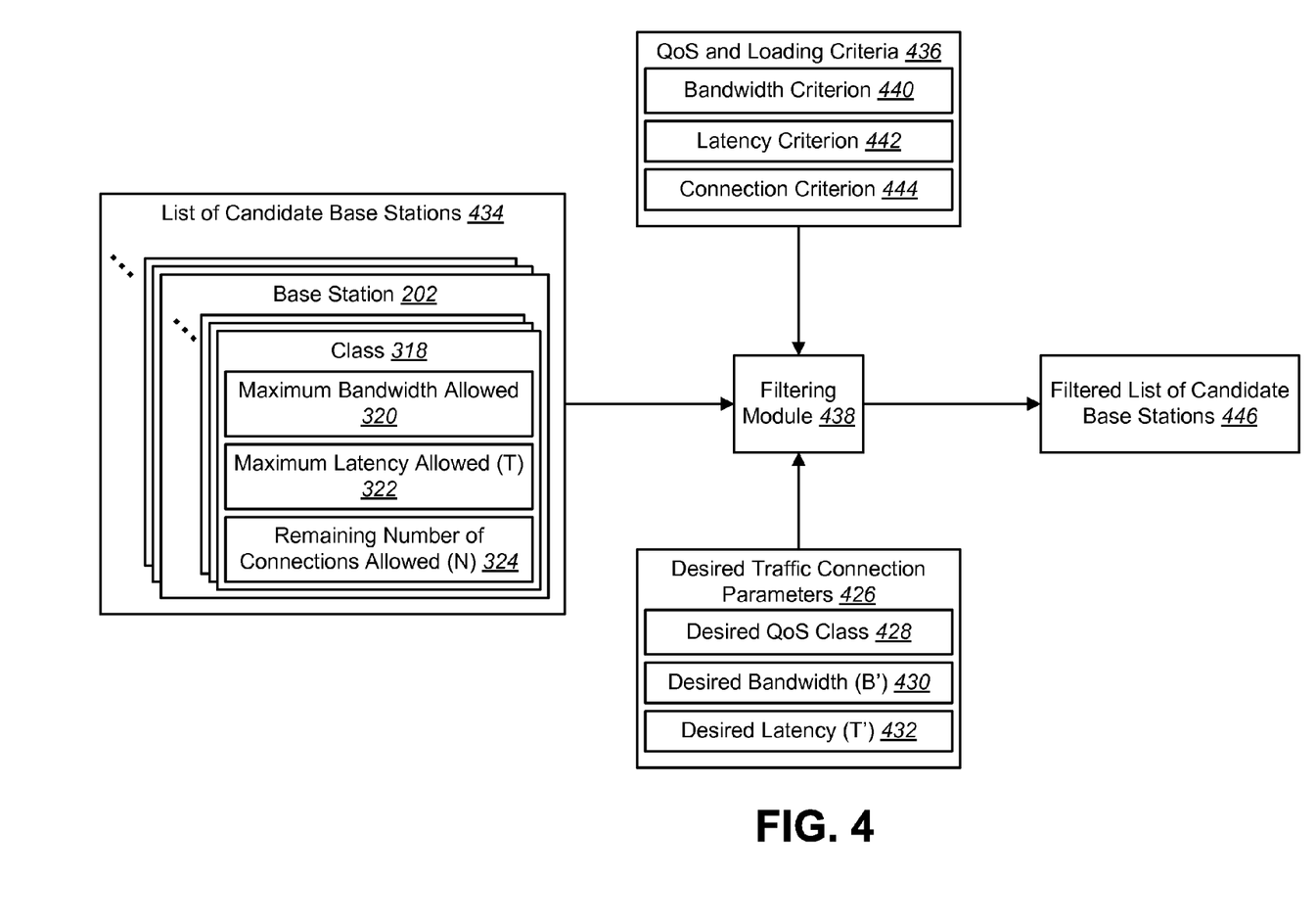
FIG. 4 illustrates certain aspects of the operation of a mobile station in accordance with the present disclosure.
Figure 5:
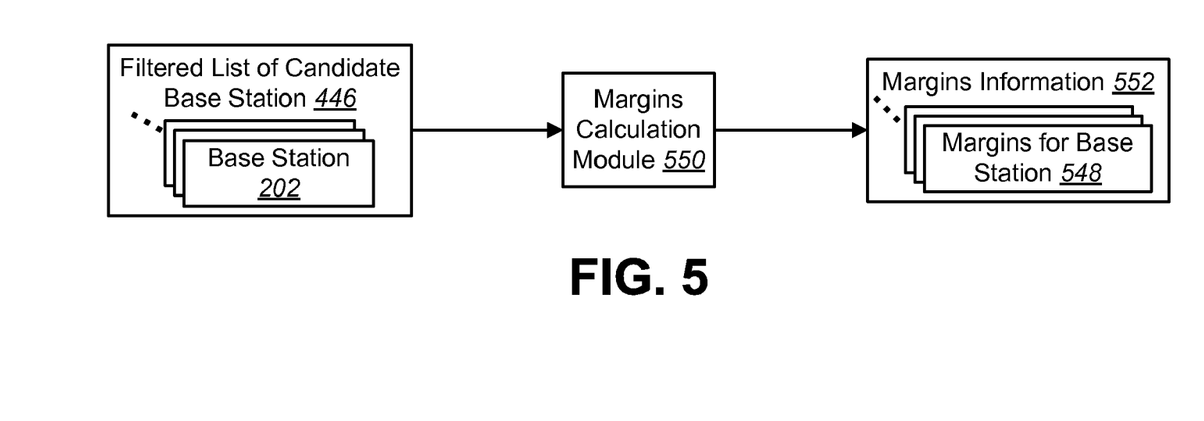
FIG. 5 illustrates certain additional aspects of the operation of a mobile station in accordance with the present disclosure.
Figure 6:
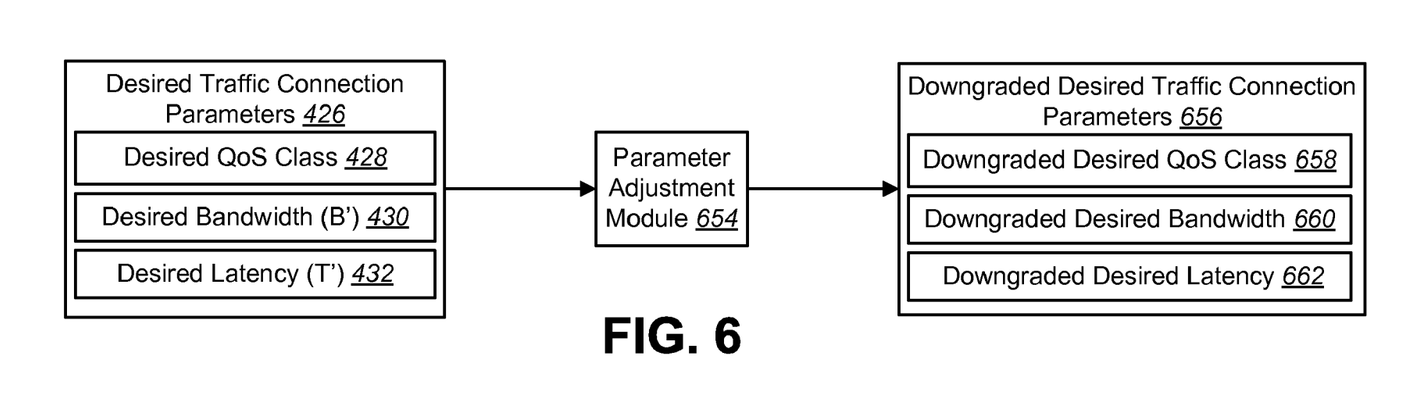
FIG. 6 illustrates certain additional aspects of the operation of a mobile station in accordance with the present disclosure.

FIGS. 4 through 6 illustrate certain aspects of the operation of the mobile station 204. Reference is initially made to FIG. 4. At some point, a demand for a new traffic connection may arise at the mobile station 204. Certain parameters 426 may be associated with the desired traffic connection. The desired traffic connection parameters 426 may include a desired QoS class 428, a desired bandwidth (B') 430 and a desired latency (T') 432.

The mobile station 204 may be located within the coverage area of multiple base stations 202. Thus, there may be multiple base stations 202 from which the mobile station 204 may request the desired traffic connection. As indicated above, the mobile station 204 may have received QoS information 212 and loading information 214 from these candidate base stations 202. The mobile station 204 may create a list 434 of candidate base stations 202, which may include the QoS information 212 and the loading information 214 received from the candidate base stations 202.

The mobile station 204 may filter out the candidate base stations 202 that are not capable of satisfying certain QoS and loading criteria 436. A filtering module 438 is shown for providing this functionality. The filtering module 438 may compare the QoS information 212 and the loading information 214 received from the candidate base stations 202 with the desired traffic connection parameters 426 to see if the QoS and loading criteria 436 are satisfied.

The QoS and loading criteria 436 may include a bandwidth criterion 440, a latency criterion 442, and a connection criterion 444. The bandwidth criterion 440 may be that the base station 202 can provide the desired bandwidth (B') 430 for the desired QoS class 428. The latency criterion 442 may be that the base station 202 can provide the desired latency (T') 432 for the desired QoS class 428. The connection criterion 444 may be that the base station 202 has at least one available connection.

The filtering module 438 may output a filtered list 446 of candidate base stations 202. The filtered list 446 of candidate base stations 202 may include the base stations 202 that are capable of satisfying the QoS and loading criteria 436.

The filtered list 446 of candidate base stations 202 may include just one base station 202. In this situation, the mobile station 204 may select that base station 202 to receive the connection request for the desired traffic connection.

Reference is now made to FIG. 5. If the filtered list 446 of candidate base stations 202 includes multiple base stations 202 (i.e., multiple base stations 202 are capable of satisfying the QoS and loading criteria 436), then the mobile station 204 may calculate the margins 548 for these base stations 202. A margins calculation module 550 is shown for providing this functionality.

The margins calculation module 550 may output margins information 552, which may include the margins 548 for each base station 202 in the filtered list 446 of candidate base stations 202. The margins 548 for a particular base station 202 may be defined as min $\{(B-B')/B', N\}$. The mobile station 204 may select the base station 202 with the largest margins 548 to receive the connection request for the desired traffic connection.

Alternatively, the mobile station 204 may simply arbitrarily select one of the base stations 202 that satisfy the QoS and loading criteria 436 to receive the connection request. The mobile station 204 may make this selection without calculating the margins 548 for these base stations 202.

Reference is now made to FIG. 6. If the filtered list 446 of candidate base stations 202 is empty (i.e., none of the candidate base stations 202 are capable of satisfying the QoS and loading criteria 436), then the mobile station 204 may still choose one base station 202 from the list 434 of candidate base stations 202 and request admission.

However, the mobile station 204 may downgrade one or more aspects of the desired traffic connection to match the available resources of the selected base station 202. A parameter adjustment module 654 is shown for providing this functionality. For example, the mobile station 204 may downgrade the desired QoS class 428, the desired bandwidth (B') 430 and/or the desired latency (T') 432 of the desired traffic connection. Thus, downgraded desired traffic connection parameters 656 may include a downgraded desired QoS class 658, a downgraded desired bandwidth 660 and/or a downgraded desired latency 662.

Figure 7:
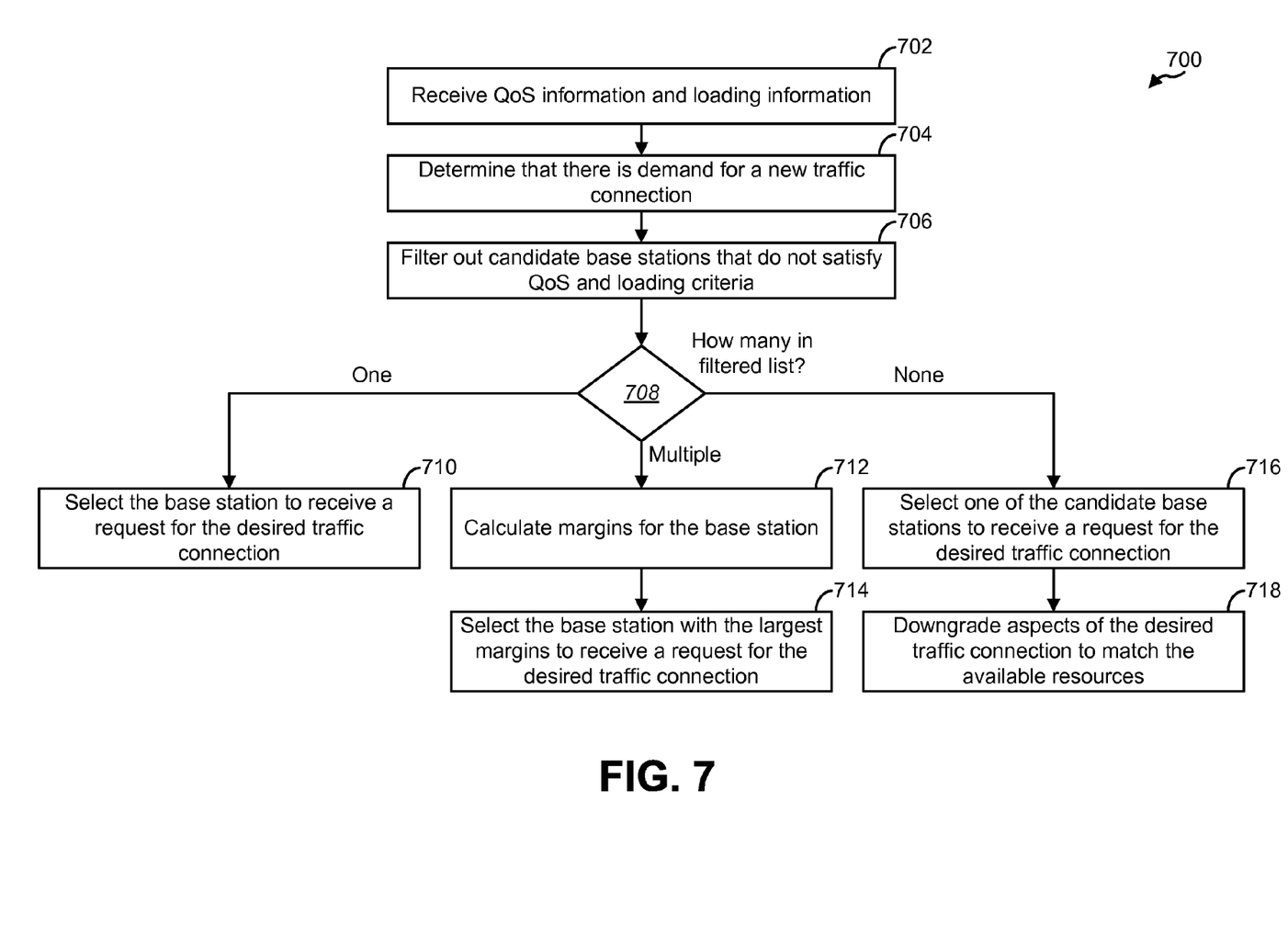
FIG. 7 illustrates a method that may be implemented by a mobile station in accordance with the present disclosure.

FIG. 7 illustrates a method 700 that may be implemented by a mobile station 204 in accordance with the present disclosure. In the depicted method 700, the mobile station 204 may receive 702 QoS information 212 and loading information 214 from at least one base station 202. The base station(s) 202 may send QoS information 212 and loading information 214 in a broadcast message 216.

At some point, the mobile station 204 may determine 704 that there is a demand for a new traffic connection. In response, the mobile station 204 may select the base station 202 from which to request the desired traffic connection based on the QoS information 212 and the loading information 214.

In order to select the appropriate base station 202, the mobile station 204 may filter 706 out the candidate base stations 202 that are not capable of satisfying certain QoS and loading criteria 436 for the desired traffic connection. As discussed above, these QoS and loading criteria 436 may include a bandwidth criterion 440 (i.e., that the base station 202 can provide the desired bandwidth 430 for the desired QoS class 428), a latency criterion 442 (i.e., that the base station 202 can provide the desired latency 432 for the desired QoS class 428), and a connection criterion 444 (that the base station 202 has at least one available connection).

Once the filtering has been completed, the mobile station 204 may determine 708 how many base stations 202 are remaining in the filtered list 446 of candidate base stations 202 (i.e., how many base stations 202 are capable of satisfying the QoS and loading criteria 436). If the filtered list 446 of candidate base stations 202 includes just one base station 202, then the mobile station 204 may select 710 that base station 202 to receive a request for the desired traffic connection.

If the filtered list 446 of candidate base stations 202 includes multiple base stations 202 (i.e., multiple base stations 202 are capable of satisfying the QoS and loading criteria 436), then the mobile station 204 may calculate 712 the margins 548 for these base stations 202. The margins 548 for a particular base station 202 may be defined as min $\{(B-B')/B', N\}$. The mobile station 204 may select 714 the base station 202 with the largest margins 548 to receive a request for the desired traffic connection. Alternatively, the mobile station 204 may simply arbitrarily select one of the base stations 202 that satisfy the QoS and loading criteria 436 to receive the connection request.

If the filtered list 446 of candidate base stations 202 is empty (i.e., none of the candidate base stations 202 are capable of satisfying the QoS and loading criteria 436), then the mobile station 204 may still select 716 one of the candidate base stations 202 to receive a request for the desired traffic connection. However, the mobile station 204 may downgrade 718 one or more aspects of the desired traffic connection to match the available resources of the selected base station 202. For example, the mobile station 204 may downgrade the desired QoS class 428, the desired bandwidth (B') 430 and/or the desired latency (T') 432 of the desired traffic connection.

Figure 8:
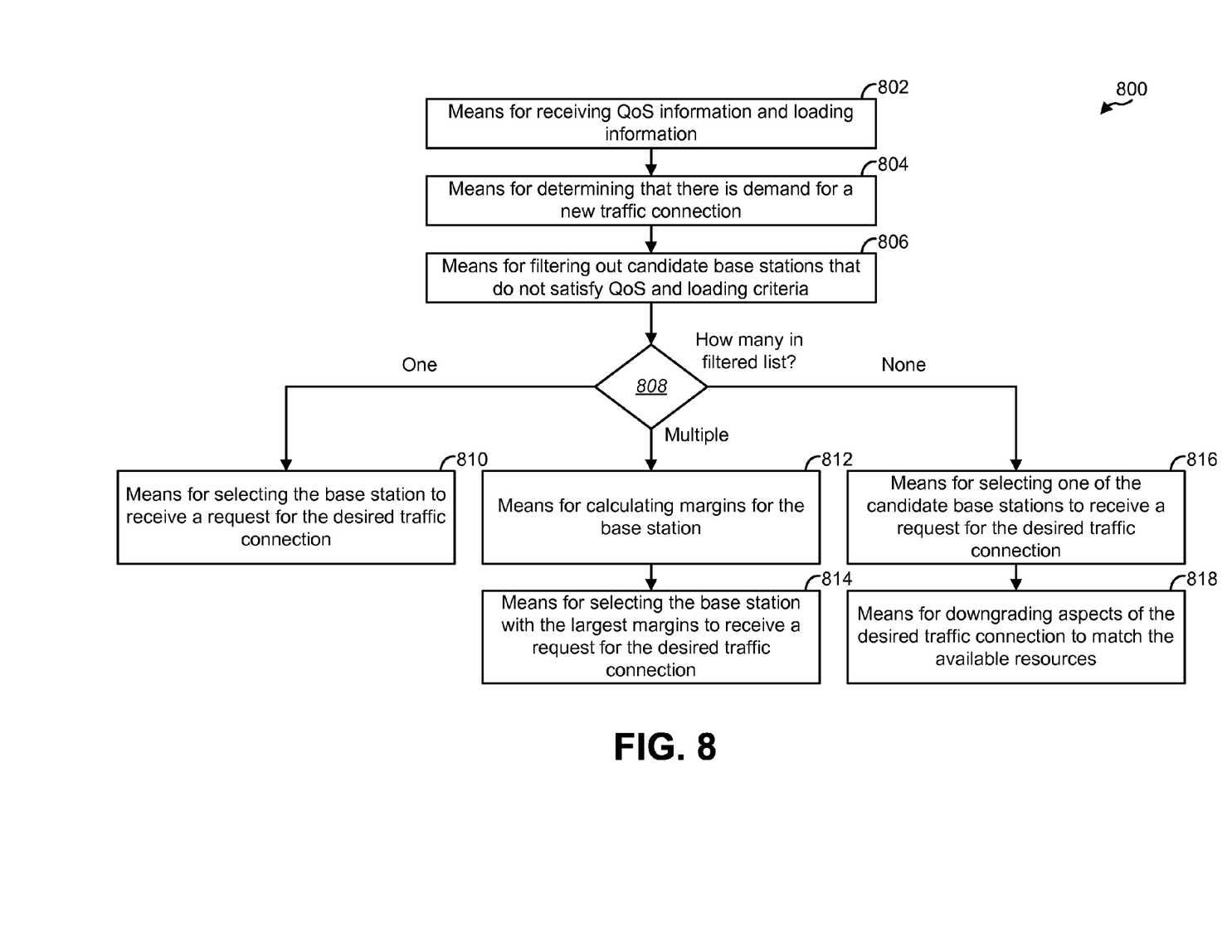
FIG. 8 illustrates means-plus-function blocks corresponding to the method of FIG. 7.

The method 700 of FIG. 7 described above may be performed by various hardware and/or software component(s) and/or module(s) corresponding to the means-plus-function blocks 800 illustrated in FIG. 8. In other words, blocks 702 through 718 illustrated in FIG. 7 correspond to means-plus-function blocks 802 through 818 illustrated in FIG. 8.

Figure 9:
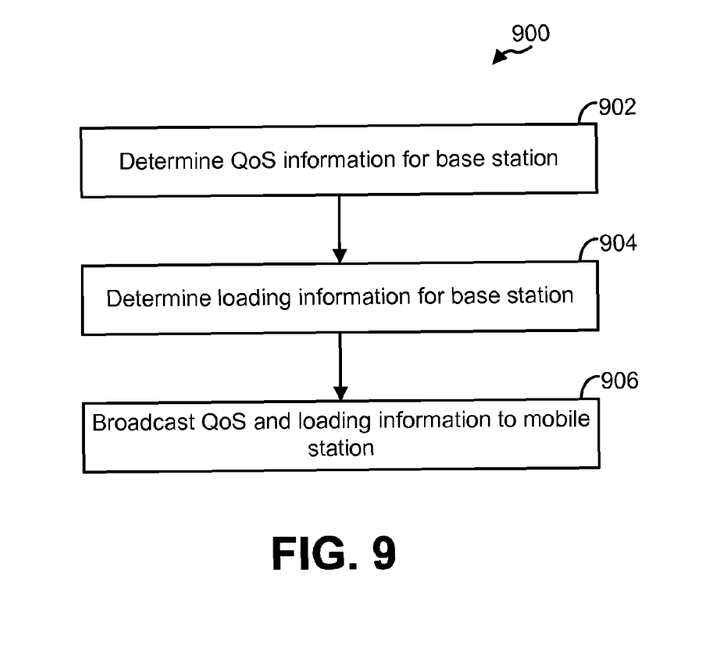
FIG. 9 illustrates a method that may be implemented by a base station in accordance with the present disclosure.

FIG. 9 illustrates a method 900 that may be implemented by a base station 202 in accordance with the present disclosure. In the depicted method 900, the base station 202 may determine 902 QoS information 212 for the base station 202. For example, the base station 202 may determine the maximum bandwidth allowed 320 by the base station 202 and the maximum latency allowed 322 by the base station 202 for one or more QoS classes 318. The base station 202 may also determine 904 loading information 214 for the base station 202. For example, the base station 202 may determine the remaining number of connections allowed 324 by the base station 202.

The base station 202 may also broadcast 906 the QoS information 212 and the loading information 214 to mobile stations 204. If the base station 202 is configured for operation in a WiMAX system, then the QoS information 212 and the loading information 214 may be included in new parameters of an existing WiMAX message (e.g., the downlink MAP message, the uplink MAP message, etc.), or in a new WiMAX message. The QoS information 212 and the loading information 214 may be broadcast once every N frames. Alternatively, the QoS information 212 and the loading information 214 may be broadcast every frame.

Figure 10:
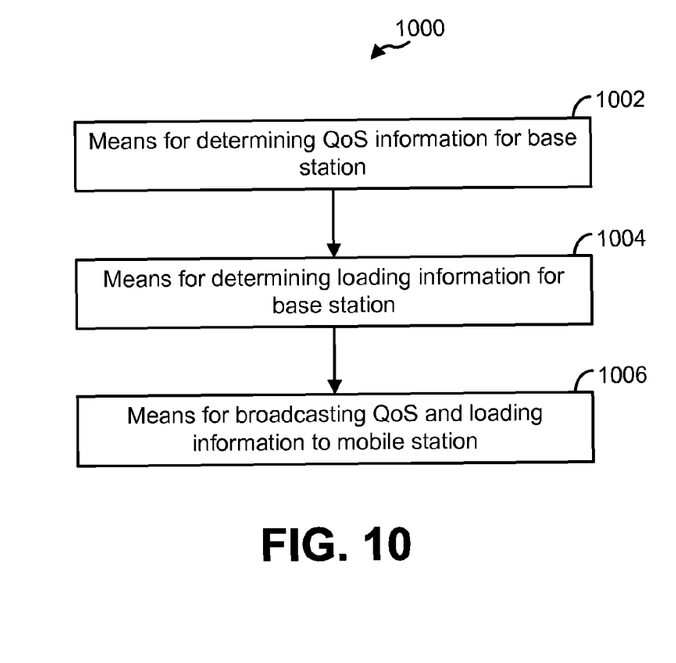
FIG. 10 illustrates means-plus-function blocks corresponding to the method of FIGS. 9.

The method 900 of FIG. 9 described above may be performed by various hardware and/or software component(s) and/or module(s) corresponding to the means-plus-function blocks 1000 illustrated in FIG. 10. In other words, blocks 902 through 906 illustrated in FIG. 9 correspond to means-plus-function blocks 1002 through 1006 illustrated in FIG. 10.

The methods disclosed herein may provide certain advantages relative to known approaches. Having base stations 202 broadcast QoS information 212 and loading information 214 allows mobile stations 204 to use this information when making connection requests. For example, a mobile station 204 that is within the coverage area of multiple base stations 202 may use the QoS information 212 and the loading information 214 to choose the most preferred base station 202 (e.g., the base station 202 that provides the best QoS). In addition, the mobile station 204 may use the QoS information 212 and the loading information 214 to choose what QoS parameters should be requested. Thus, the methods disclosed herein may increase the likelihood that the mobile station's 204 connection request will be accepted by the base station 202.

As indicated above, the methods and apparatus disclosed herein may be implemented in WiMAX systems. However, the scope of the present disclosure should not be limited in this regard. The methods and apparatus disclosed herein may be utilized in other types of wireless communication systems as well.

Figure 11:
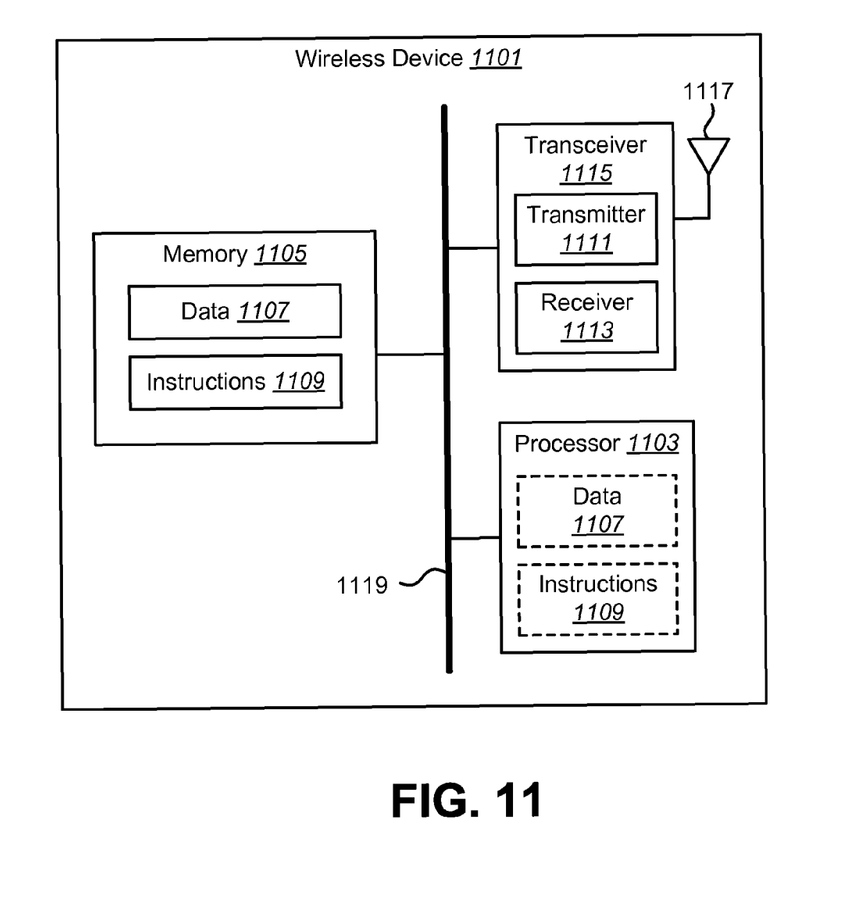
FIG. 11 illustrates certain components that may be included within a wireless device.

FIG. 11 illustrates certain components that may be included within a wireless device 1101. The wireless device 1101 may be a mobile station 204 or a base station 202.

The wireless device 1101 includes a processor 1103. The processor 1103 may be a general purpose single- or multi-chip microprocessor (e.g., an ARM), a special purpose microprocessor (e.g., a digital signal processor (DSP)), a microcontroller, a programmable gate array, etc. The processor 1103 may be referred to as a central processing unit (CPU). Although just a single processor 1103 is shown in the wireless device 1101 of FIG. 11, in an alternative configuration, a combination of processors (e.g., an ARM and DSP) could be used.

The wireless device 1101 also includes memory 1105. The memory 1105 may be any electronic component capable of storing electronic information. The memory 1105 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1107 and instructions 1109 may be stored in the memory 1105. The instructions 1109 may be executable by the processor 1103 to implement the methods disclosed herein. Executing the instructions 1109 may involve the use of the data 1107 that is stored in the memory 1105.

The wireless device 1101 may also include a transmitter 1111 and a receiver 1113 to allow transmission and reception of signals between the wireless device 1101 and a remote location. The transmitter 1111 and receiver 1113 may be collectively referred to as a transceiver 1115. An antenna 1117 may be electrically coupled to the transceiver 1115. The wireless device 1101 may also include (not shown) multiple transmitters, multiple receivers, multiple transceivers and/or multiple antenna.

The various components of the wireless device 1101 may be coupled together by one or more buses, which may include a power bus, a control signal bus, a status signal bus, a data bus, etc. For the sake of clarity, the various buses are illustrated in FIG. 11 as a bus system 1119.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements. The terms "instructions" and "code" may be used interchangeably herein.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 7 and 9, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A mobile station configured for facilitating efficient admission control, comprising:

means for receiving quality of service (QoS) information and loading information from at least one base station;
means for determining that there is demand for a traffic connection; and
means for selecting a base station from which to request the desired traffic connection by filtering out candidate base stations that are not capable of satisfying QoS and loading criteria for the desired traffic connection,
wherein the QoS and loading criteria for a particular base station comprise:
a bandwidth criterion that the base station's maximum allowed bandwidth exceeds a desired bandwidth for the desired traffic connection;
a latency criterion that the base station's maximum allowed latency exceeds a desired latency for the desired traffic connection; and
a connection criterion that the base station has at least one available connection.

2. A mobile station configured for facilitating efficient admission control, comprising:
means for receiving quality of service (QoS) information and loading information from at least one base station;
means for determining that there is demand for a traffic connection; and
means for selecting a base station from which to request the desired traffic connection by filtering out candidate base stations that are not capable of satisfying QoS and loading criteria for the desired traffic connection,
wherein if only one base station is capable of satisfying the QoS and loading criteria, the mobile station further comprises means for selecting that base station to receive a request for the desired traffic connection.

3. A mobile station configured for facilitating efficient admission control, comprising:
means for receiving quality of service (QoS) information and loading information from at least one base station;
means for determining that there is demand for a traffic connection; and
means for selecting a base station from which to request the desired traffic connection by filtering out candidate base stations that are not capable of satisfying QoS and loading criteria for the desired traffic connection,
wherein if multiple base stations are capable of satisfying the QoS and loading criteria, the mobile station further comprises:
means for calculating margins for the multiple base stations; and
means for selecting the base station with the largest margins to receive a request for the desired traffic connection.

4. A method for facilitating efficient admission control, the method being implemented by a mobile station, the method comprising:
receiving quality of service (QoS) information and loading information from at least one base station;
determining that there is demand for a traffic connection; and
selecting a base station from which to request the desired traffic connection by filtering out candidate base stations that are not capable of satisfying QoS and loading criteria for the desired traffic connection,
wherein the QoS and loading criteria for a particular base station comprise:
a bandwidth criterion that the base station's maximum allowed bandwidth exceeds a desired bandwidth for the desired traffic connection;
a latency criterion that the base station's maximum allowed latency exceeds a desired latency for the desired traffic connection; and
a connection criterion that the base station has at least one available connection.

5. A method for facilitating efficient admission control, the method being implemented by a mobile station, the method comprising:
receiving quality of service (QoS) information and loading information from at least one base station;
determining that there is demand for a traffic connection; and
selecting a base station from which to request the desired traffic connection by filtering out candidate base stations that are not capable of satisfying QoS and loading criteria for the desired traffic connection,
wherein if only one base station is capable of satisfying the QoS and loading criteria, the method further comprises selecting that base station to receive a request for the desired traffic connection.

6. A method for facilitating efficient admission control, the method being implemented by a mobile station, the method comprising:
receiving quality of service (QoS) information and loading information from at least one base station;
determining that there is demand for a traffic connection; and
selecting a base station from which to request the desired traffic connection by filtering out candidate base stations that are not capable of satisfying QoS and loading criteria for the desired traffic connection,
wherein if multiple base stations are capable of satisfying the QoS and loading criteria, the method further comprises:
calculating margins for the multiple base stations; and
selecting the base station with the largest margins to receive a request for the desired traffic connection.

7. A method for facilitating efficient admission control, the method being implemented by a mobile station, the method comprising:
receiving quality of service (QoS) information and loading information from at least one base station;
determining that there is demand for a traffic connection; and
selecting a base station from which to request the desired traffic connection by filtering out candidate base stations that are not capable of satisfying QoS and loading criteria for the desired traffic connection,
wherein if multiple base stations are capable of satisfying the QoS and loading criteria, the method further comprises arbitrarily selecting one of the multiple base stations to receive a request for the desired traffic connection.

8. A method for facilitating efficient admission control, the method being implemented by a mobile station, the method comprising:
receiving quality of service (QoS) information and loading information from at least one base station;
determining that there is demand for a traffic connection; and
selecting a base station from which to request the desired traffic connection by filtering out candidate base stations that are not capable of satisfying QoS and loading criteria for the desired traffic connection,
wherein if there are not any base stations that are capable of satisfying the QoS and loading criteria, the method further comprises:

selecting a base station to receive a request for the desired traffic connection; and downgrading one or more aspects of the desired traffic connection to match available resources of the selected base station.

9. A mobile station configured for facilitating efficient admission control, comprising:

means for receiving quality of service (QoS) information and loading information from at least one base station;

means for determining that there is demand for a traffic connection; and means for selecting a base station from which to request the desired traffic connection by filtering out candidate base stations that are not capable of satisfying QoS and loading criteria for the desired traffic connection, wherein if multiple base stations are capable of satisfying the QoS and loading criteria, the mobile station further comprises means for arbitrarily selecting one of the multiple base stations to receive a request for the desired traffic connection.

10. A mobile station configured for facilitating efficient admission control, comprising:

means for receiving quality of service (QoS) information and loading information from at least one base station;

means for determining that there is demand for a traffic connection; and means for selecting a base station from which to request the desired traffic connection by filtering out candidate base stations that are not capable of satisfying QoS and loading criteria for the desired traffic connection, wherein if there are not any base stations that are capable of satisfying the QoS and loading criteria, the mobile station further comprises:

means for selecting a base station to receive a request for the desired traffic connection; and means for downgrading one or more aspects of the desired traffic connection to match available resources of the selected base station.

11. A computer-program product for facilitating efficient admission control by a mobile station, the computer-program product comprising a non-transitory computer-readable memory having instructions stored thereon, the instructions comprising:

code for receiving quality of service (QoS) information and loading information from at least one base station;

code for determining that there is demand for a traffic connection; and code for selecting a base station from which to request the desired traffic connection by filtering out candidate base stations that are not capable of satisfying QoS and loading criteria for the desired traffic connection, wherein the QoS and loading criteria for a particular base station comprise:

a bandwidth criterion that the base station's maximum allowed bandwidth exceeds a desired bandwidth for the desired traffic connection;

a latency criterion that the base station's maximum allowed latency exceeds a desired latency for the desired traffic connection; and a connection criterion that the base station has at least one available connection.

12. A computer-program product for facilitating efficient admission control by a mobile station, the computer-program product comprising a non-transitory computer-readable memory having instructions stored thereon, the instructions comprising:

code for receiving quality of service (QoS) information and loading information from at least one base station;

code for determining that there is demand for a traffic connection; and code for selecting a base station from which to request the desired traffic connection by filtering out candidate base stations that are not capable of satisfying QoS and loading criteria for the desired traffic connection, wherein if only one base station is capable of satisfying the QoS and loading criteria, the mobile station further comprises code for selecting that base station to receive a request for the desired traffic connection.

13. A mobile station configured for facilitating efficient admission control, comprising:

a processor;

memory in electronic communication with the processor;

instructions stored in the memory, the instructions being executable by the processor to:

receive quality of service (QoS) information and loading information from at least one base station;

determine that there is demand for a traffic connection; and select a base station from which to request the desired traffic connection by filtering out candidate base stations that are not capable of satisfying QoS and loading criteria for the desired traffic connection, wherein the QoS and loading criteria for a particular base station comprise:

a bandwidth criterion that the base station's maximum allowed bandwidth exceeds a desired bandwidth for the desired traffic connection;

a latency criterion that the base station's maximum allowed latency exceeds a desired latency for the desired traffic connection; and a connection criterion that the base station has at least one available connection.

14. A mobile station configured for facilitating efficient admission control, comprising:

a processor;

memory in electronic communication with the processor;

instructions stored in the memory, the instructions being executable by the processor to:

receive quality of service (QoS) information and loading information from at least one base station;

determine that there is demand for a traffic connection; and select a base station from which to request the desired traffic connection by filtering out candidate base stations that are not capable of satisfying QoS and loading criteria for the desired traffic connection, wherein if only one base station is capable of satisfying the QoS and loading criteria, the instructions are also executable to select that base station to receive a request for the desired traffic connection.

15. A mobile station configured for facilitating efficient admission control, comprising:

a processor;

memory in electronic communication with the processor;

instructions stored in the memory, the instructions being executable by the processor to:

receive quality of service (QoS) information and loading information from at least one base station;

determine that there is demand for a traffic connection; and select a base station from which to request the desired traffic connection by filtering out candidate base stations that are not capable of satisfying QoS and loading criteria for the desired traffic connection,
wherein if multiple base stations are capable of satisfying the QoS and loading criteria, the instructions are also executable to:
calculate margins for the multiple base stations; and
select the base station with the largest margins to receive a request for the desired traffic connection.

16. A mobile station configured for facilitating efficient admission control, comprising:
a processor;
memory in electronic communication with the processor;
instructions stored in the memory, the instructions being executable by the processor to:
receive quality of service (QoS) information and loading information from at least one base station;
determine that there is demand for a traffic connection; and
select a base station from which to request the desired traffic connection by filtering out candidate base stations that are not capable of satisfying QoS and loading criteria for the desired traffic connection,
wherein if multiple base stations are capable of satisfying the QoS and loading criteria, the instructions are also executable to arbitrarily select one of the multiple base stations to receive a request for the desired traffic connection.

17. A mobile station configured for facilitating efficient admission control, comprising:
a processor;
memory in electronic communication with the processor;
instructions stored in the memory, the instructions being executable by the processor to:
receive quality of service (QoS) information and loading information from at least one base station;
determine that there is demand for a traffic connection; and
select a base station from which to request the desired traffic connection by filtering out candidate base stations that are not capable of satisfying QoS and loading criteria for the desired traffic connection,
wherein if there are not any base stations that are capable of satisfying the QoS and loading criteria, the instructions are also executable to:
select a base station to receive a request for the desired traffic connection; and
downgrade one or more aspects of the desired traffic connection to match available resources of the selected base station.

18. A computer-program product for facilitating efficient admission control by a mobile station, the computer-program product comprising a non-transitory computer-readable memory having instructions stored thereon, the instructions comprising:
code for receiving quality of service (QoS) information and loading information from at least one base station;
code for determining that there is demand for a traffic connection; and
code for selecting a base station from which to request the desired traffic connection by filtering out candidate base stations that are not capable of satisfying QoS and loading criteria for the desired traffic connection,
wherein if multiple base stations are capable of satisfying the QoS and loading criteria, the mobile station further comprises:
code for calculating margins for the multiple base stations; and
code for selecting the base station with the largest margins to receive a request for the desired traffic connection.

19. A computer-program product for facilitating efficient admission control by a mobile station, the computer-program product comprising a non-transitory computer-readable memory having instructions stored thereon, the instructions comprising:
code for receiving quality of service (QoS) information and loading information from at least one base station;
code for determining that there is demand for a traffic connection; and
code for selecting a base station from which to request the desired traffic connection by filtering out candidate base stations that are not capable of satisfying QoS and loading criteria for the desired traffic connection,
wherein if multiple base stations are capable of satisfying the QoS and loading criteria, the mobile station further comprises code for arbitrarily selecting one of the multiple base stations to receive a request for the desired traffic connection.

20. A computer-program product for facilitating efficient admission control by a mobile station, the computer-program product comprising a non-transitory computer-readable memory having instructions stored thereon, the instructions comprising:
code for receiving quality of service (QoS) information and loading information from at least one base station;
code for determining that there is demand for a traffic connection; and
code for selecting a base station from which to request the desired traffic connection by filtering out candidate base stations that are not capable of satisfying QoS and loading criteria for the desired traffic connection,
wherein if there are not any base stations that are capable of satisfying the QoS and loading criteria, the mobile station further comprises:
code for selecting a base station to receive a request for the desired traffic connection; and
code for downgrading one or more aspects of the desired traffic connection to match available resources of the selected base station.

* * * * *